Patented Aug. 27, 1935

2,012,928

UNITED STATES PATENT OFFICE 2,012,928

SYNTHETIC TANS

Franz Hassler, Hamburg-Volksdorf, Germany, assignor to I. G. Farbenindustrie Aktiengesellschaft, Frankfort-on-the-Main, Germany No Drawing. Application December 26, 1933, Serial No. 704,057. In Germany September 23, 1931

5 Claims.  (Cl. 260—3)

This invention relates to improved synthetic tans and more particularly to those of the phenol-sulphonic-formaldehyde type.

It has been suggested to produce synthetic tans of the aforesaid kind by various methods of condensation and sulphonation, one of which methods consists in causing formaldehyde to react with a phenol sulphonic acid (including sulphonated cresols and higher phenols) in a solution containing an excess of caustic alkali.

I have made the surprising discovery that quite contrary to expectation the kind of alkali present greatly influences the character of the products obtained and more particularly speaking, that the employment of ammonia or other ammoniacal base instead of caustic alkali or other fixed base, or part thereof, leads to products of new and improved properties.

The new products are distinctly different from those obtained in the presence of caustic soda lye alone. While these latter products are soluble in water in all concentrations, and furthermore are not precipitated from such solutions upon the addition of large quantities of an acid, the products obtained in the presence of ammonia or an ammoniacal base, although they are not precipitated from their concentrated aqueous solutions on slightly acidulating, are precipitated therefrom upon the addition of further moderate amounts of acid. Likewise they are precipitated from such concentrated aqueous solutions (both the practically neutral as well as the slightly acid ones) when these solutions are diluted. Such precipitates dissolve in hot water and are also dissolved by an addition of phenol sulphonic acid or similar acids.

The new products are especially distinguished by their ability to produce much fuller leather than do the condensation products obtained in acid or caustic alkaline solution.

The new process may be performed in any suitable manner. Formaldehyde and ammonia may be replaced, wholly or partly, by their known reaction product, hexamethylenetetramine, and formaldehyde may be employed as such or in a disguised form, for example, in the form of formaldehyde bisulphite, or methylene chloride, which are its equivalents. Ammoniacal bases, such as methyl, ethyl, propyl or butyl amine or amines containing two such radicles or one or more higher radicles, for example, cyclohexyl, dodecyl or cetyl, may be used. As a fixed base, to be employed at the same time, caustic potash or soda, calcium hydroxide, potassium or sodium carbonate, sodium acetate and the like may be mentioned.

As phenols, not only homologues of phenol, but naphthols and condensation products, such as para-dioxydiphenyl-methane, para-dioxydiphenyl dimethyl methane or halogen derivatives thereof, may be cited.

Condensation may be effected between about 80° and 180° C., the time required being dependent upon the starting materials, concentration, temperature and other circumstances; six hours being a suitable time of reaction in most cases.

After the reaction the mixture may be simply diluted and slightly acidulated with sulphuric, or other, acid to the usual or any desired degree; the tans may also be reduced to a dry state either on heated rollers or as a spray in a hot atmosphere of air or other gas.

Generally speaking the products obtained in the presence of an ammoniacal base or of an ammoniacal base and a fixed alkali not only possess the ability to produce leather of great weight, but also are of a light color and exhibit good stability to light.

I will now illustrate my invention by some typical examples to which however the scope of my claims is in no way restricted. The parts are by weight.

Example 1

50 parts of phenol are sulphonated by heating with 50 parts of concentrated sulphuric acid to about 120° C. for two to three hours and then mixed with an excess of aqueous ammonia. 40 parts of formaldehyde (30 per cent) are then added and the mixture is heated, finally to between 130° and 160° C. The pale yellow mass is dissolved in a little hot water. The resultant solution remains clear on being slightly acidulated with sulphuric acid, but on diluting with water a white precipitate is produced. No precipitate is however obtained, even when strongly diluting and acidulating, on previous addition of anthracene sulphonic acid.

Very similar products are obtained when, instead of phenol in the foregoing example, 50 parts of cresylic acid are employed. Other homologous phenols or salicylic acid may be used. By increasing the amount of formaldehyde, more readily soluble products are obtained.

Example 2

900 parts of cresol sulphonic acid are made slightly alkaline with 650 parts of caustic soda lye of 40° Bé., whereupon 72 parts of hexamethylene tetramine, dissolved in 128 parts of water, are added. The solution is evaporated to three quarters its initial volume, while stirring, and then diluted with 100 parts of water. The reaction products are then slightly acidulated by an addition of 270 parts of sulphuric acid of 50° Bé. gravity. A slightly yellowish paste is obtained, which is readily soluble in water.

Instead of hexamethylene tetramine 272 parts of ammonia (25 per cent) or 124 parts of methylamine and 600 parts of formaldehyde (30 per cent) may be employed, products having similar properties being obtained.

What I claim is:—

1. A process of producing synthetic tans which comprises condensing a sulphonated phenol with formaldehyde in the presence of an ammoniacal base in excess of the quantity required to completely neutralize the phenol sulphonic acid employed.

2. A process of producing synthetic tans which comprises condensing a sulphonated phenol with formaldehyde in the presence of free ammonia in excess of the quantity required to completely neutralize the phenol sulphonic acid employed.

3. A process of producing synthetic tans which comprises condensing a sulphonated phenol with formaldehyde in the presence of an ammoniacal base as well as a fixed alkaline substance in excess of the quantity required to completely neutralize the phenol sulphonic acid employed.

4. A process of producing synthetic tans which consists in condensing a sulphonated phenol with formaldehyde in the presence of free ammonia and an alkaline alkali metal compound in excess of the quantity required to completely neutralize the phenol sulphonic acid employed.

5. Synthetic tans comprising a condensation product of a sulphonated phenol, formaldehyde and an ammoniacal base, which condensation product is not precipitated from concentrated aqueous solutions on slightly acidulating and is capable of producing leather of greater weight than can a phenol sulphonic acid formaldehyde condensation product produced in the presence of caustic soda lye alone.

FRANZ HASSLER.